United States Patent
Thomsen

(10) Patent No.: US 8,145,023 B2
(45) Date of Patent: Mar. 27, 2012

(54) LIFETIME EXTENDING AND PERFORMANCE IMPROVEMENTS OF MICRO-STRUCTURED FIBERS VIA HIGH TEMPERATURE LOADING

(75) Inventor: Carsten L. Thomsen, Virum (DK)

(73) Assignee: NKT Photonics A/S, Birkerod (DK)

( * ) Notice: Subject to any disclaimer, the term of this patent is extended or adjusted under 35 U.S.C. 154(b) by 350 days.

(21) Appl. No.: 12/522,758

(22) PCT Filed: Jan. 14, 2008

(86) PCT No.: PCT/DK2008/000012
§ 371 (c)(1),
(2), (4) Date: Aug. 11, 2009

(87) PCT Pub. No.: WO2008/083686
PCT Pub. Date: Jul. 17, 2008

(65) Prior Publication Data
US 2010/0040335 A1  Feb. 18, 2010

(30) Foreign Application Priority Data
Jan. 12, 2007 (DK) .................. 2007 00050

(51) Int. Cl.
*G02B 6/00* (2006.01)
*G02B 6/10* (2006.01)
*G02F 1/365* (2006.01)

(52) U.S. Cl. .......... 385/122; 385/141; 385/123; 372/21; 264/1.24

(58) Field of Classification Search .................. 385/123, 385/122, 124, 125, 141; 65/385; 372/21; 264/1.24
See application file for complete search history.

(56) References Cited

U.S. PATENT DOCUMENTS

| 6,311,524 B1 * | 11/2001 | Brennan et al. ................. 65/378 |
| 6,564,585 B2 * | 5/2003 | Abe et al. ........................ 65/30.1 |
| 6,763,686 B2 * | 7/2004 | Carpenter et al. .............. 65/413 |
| 7,493,009 B2 * | 2/2009 | Homa .......................... 385/142 |
| 2004/0057682 A1 | 3/2004 | Nicholson et al. |
| 2005/0226576 A1 | 10/2005 | Feder et al. |
| 2010/0040335 A1 * | 2/2010 | Thomsen ..................... 385/122 |
| 2011/0116283 A1 * | 5/2011 | Thomsen et al. ............. 362/553 |

FOREIGN PATENT DOCUMENTS

| EP | 0 943 936 | 9/1999 |
| EP | 1 426 795 | 6/2004 |
| WO | WO 00/37974 | 6/2000 |
| WO | WO 02/06868 | 1/2002 |
| WO | WO 03/078338 | 9/2003 |

(Continued)

OTHER PUBLICATIONS

Bjarklev et al., "Photonic Crystal Fibres" Kluwer Academic Press, 2003, Chapter IV, pp. 115-130.

(Continued)

*Primary Examiner* — Brian Healy
(74) *Attorney, Agent, or Firm* — Buchanan Ingersoll & Rooney PC

(57) ABSTRACT

The disclosure relates to an optical fiber including a core and a cladding having a core material and a cladding material, respectively, wherein the fiber is a non-linear microstructured optical fiber, the microstructured optical fiber being obtainable by a method including loading the core material and optionally the cladding material with hydrogen and/or deuterium whereby the lifetime of the fiber may be extended in high pulse applications.

27 Claims, 9 Drawing Sheets

FOREIGN PATENT DOCUMENTS

| | | |
|---|---|---|
| WO | WO 2004/095096 | 11/2004 |
| WO | WO 2006/021569 | 3/2006 |
| WO | WO 2008/003138 | 1/2008 |

OTHER PUBLICATIONS

Birks et al., "2D Photonic Band Gap Structures in Fibre Form" Photonic Band Gap Materials, Kluwer, 1996, pp. 1-8.

Knight et al., "All-Silica Single-Mode Optical Fiber with Photonic Crystal Cladding" Optics Letters, 1996, vol. 21, No. 19, pp. 1547-1549.

Li et al., "Interaction of Supercontinuum and Raman Solitons with Microstructure Fiber Gratings" Optics Express, 2005, vol. 13, No. 3, pp. 998-1007, XP-002474853.

* cited by examiner

LIFETIME EXTENDING AND PERFORMANCE IMPROVEMENTS OF MICRO-STRUCTURED FIBERS VIA HIGH TEMPERATURE LOADING

TECHNICAL FIELD

The invention relates specifically to an optical fibre comprising a core and a cladding each comprising a core material and a cladding material, respectively, wherein said fibre is a non-linear microstructured optical.

BACKGROUND ART

More recently, an optical fibre called a microstructured fibre, photonic crystal fibre (PCF) or holey fibre has been developed (a special case of such fibres is sometimes referred to as photonic bandgab fibre (PBG)). This PCF comprises a cladding made of a transparent material in which an array of holes is embedded along the length of the fibre [J. C. Knight, et al., Opt. Lett. 21 (1996) p. 1547. Errata: Opt. Lett. 22 (1997) p. 484]. The holes are commonly arranged transversely in a periodic array and are filled with a material which has a lower refractive index than the rest of the cladding. The centre of the fibre commonly comprises a transparent region which breaks the periodicity of the cladding this region often functions as the core of the fibre. However, in principle this region need not be in the centre of the cross section. Commonly the cross section of the fibre comprises a core region comprising a core region material, surrounded by a cladding region comprising holes (optionally filled with air or a gas), solid or liquid micro-structural elements embedded in a cladding background material both regions extending in a longitudinal direction of the optical fibre. Commonly the core will guide 80% or more of the light in the operating wavelengths of the fibre. Typically, both the core and the cladding are made from pure fused silica and the holes are filled with air. In a variation thereof the PCF comprises transversely arranged rods of another material instead of holes. Such fibres are e.g. disclosed in WO 00/37974 which also discloses the PCFs with transversely arranged holes.

The PCF type are generally produced from rod shaped units which are stacked to form a preform, which thereafter is drawn in one or more steps to form the final optical fibre. In 2D Photonic band gap structures in fibre form", T. A. Birks et al. "Photonic Band Gap Materials", Kluwer, 1996 is disclosed a method of producing a preform from rods in the form of capillary tubes by stacking the tubes. A method of fabrication of PCFs is also. described in chapter IV, pp. 115-130 of "Photonic crystal fibres", Kluwer Academic Press, 2003, by Bjarklev, Broeng, and Bjarklev.

WO 03/078338 discloses a method of producing a preform for a microstructured optical fibre wherein a plurality of elongate elements are placed parallel to each other in a vessel where after at least a portion of said vessel is filled with a silica-containing sol, which is dried and sintered.

Microstructured optical fibres are a relatively new technical field where the properties of the waveguide may be designed with a relatively large degree of freedom. Such fibres are commonly made of pure silica comprising a pattern, often made of holes or doped glass, extending in the longitudinal direction of the fibre. The freedom of design makes such fibres interesting for application requiring specific non-linear properties of the fibre. One such application is supercontinuum generation wherein a fibre based source is cable of generating a wide spectral output. Supercontinuum (SC) generation in microstructured fibres has for several years been studied as a source of spatially coherent broadband light (termed white light or super continuum). While new applications of such sources are continuously discovered, several have already been identified, such as various forms of fluorescent microscopy, laser precision spectroscopy, and optical coherence tomography (OCT). High brightness emission in the visible part of the spectrum is especially important for confocal fluorescent microscopy. However, insufficient power in the short wavelength part of the spectrum has so far kept SC-sources from unveiling their full potential within this field. High-power visible SC-generation has been targeted in the experiments presented here.

Most research has so far been based on seeding the non-linear fibre with femtosecond (fs)-lasers but SC-generation using nanosecond- and picosecond (ps)-lasers has also been demonstrated. The latter greatly reduces both cost and complexity of the system, while maintaining a high repetition rate and efficient SC generation. Furthermore, it is generally possible to generate more spectrally uniform SC-spectra in the ps-domain, where also more powerful seed sources are available leading to correspondingly more powerful continua while staying below the damage threshold of the fibre—In all, ps-systems are often particular attractive for real world applications outside optical research laboratories.

The limitation of the average power/spectral density of the supercontinuum source and the width of the supercontinuum is the damage threshold of the nonlinear fibre. The input facet or the first few millimetre of fibre can be destroyed if the peak power or pulse energy is above the bulk glass or glass-air interface damage threshold and the system will have a catastrophic failure. It has been observed by the present inventors that when the peak power or pulse energy is below this threshold the micro-structured nonlinear fibre may still be observed to degrade over time. This degradation is commonly observed as decreasing power in the visible over time. For commercial applications a long life-time of a supercontinuum light source is critical and such a degradation of the fibre is commonly unacceptable.

SUMMARY OF THE INVENTION

The object of the present invention is to provide a non-linear microstructured optical fibre where such degradation is either eliminated or reduced to a tolerable level.

The objects of the invention are achieved by the invention described in the accompanying claims and as described in the following.

An object of the invention is, as defined in claim 1, achieved by an optical fibre comprising a core and a cladding comprising a core material and a cladding material, respectively, wherein said fibre is a non-linear microstructured optical fibre, said microstructured optical fibre being obtainable by a method comprising loading said core material and optionally said cladding material with hydrogen and/or deuterium. Such an optical fibre may have particular suitable properties in regard to long life in applications wherein said fibre is arranged to guide pulses with high peak power.

Loading by deuterium is sometimes applied in the art in order to overcome absorptions caused by the so-called water-band which increases when the fibre is subjected to hydrogen-rich environments, such as found for undersea communication cables. This issue is not similar to the present problem. In one embodiment the fibre is therefore applied in an environment where it is subjected to a medium with a content of $H_2$ and/or $H^+$-ions of less than 5 at %, such as less than 1 at %, such as less than 0.1 at %, such as less than 0.01 at %, such as less than 0.001 at %.

In one embodiment a non-linear fibre is taken to mean fibre which guide light for at least a range of wavelengths λmin to λmax and has a non-linear parameter γ wherein for at least part of said range the product γ·λ is more than or equal to $4 \cdot 10^{-9}$ $W^{-1}$, such as more than or equal to $5 \cdot 10^{-9}$ $W^{-1}$, such as more than or equal to $6 \cdot 10^{-9}$ $W^{-1}$, such as more than or equal to $7 \cdot 10^{-9}$ $W^{-1}$, such as more than or equal to $8 \cdot 10^{-9}$ $W^{-1}$, such as more than or equal to $10 \cdot 10^{-9}$ $W^{-1}$, such as more than or equal to $20 \cdot 10^{-9}$ $W^{-1}$, such as more than or equal to $40 \cdot 10^{-9}$ $W^{-1}$. The non-linear parameter γ is defined as Error! Objects cannot be created from editing field codes.

where here $n_2$ is the nonlinear refractive index of the fibre material and $A_{eff}$ is the effective mode area of the fibre. Commonly, $n_2$ is approximately $2.6 \cdot 10^{-20}$ $m^2/W$ for silica glass.

In one embodiment a non-linear fibre is taken to mean a fibre having a non-linear parameter γ when guiding a wavelength of 1550 nm wherein γ is more than or equal to $3 \cdot 10^{-3}$ $(Wm)^{-1}$, such as more than or equal to $5 \cdot 10^{-3}$ $(Wm)^{-1}$, such as more than or equal to $10 \cdot 10^{-3}$ $(Wm)^{-1}$, such as more than or equal to $15 \cdot 10^{-3}$ $(Wm)^{-1}$, such as more than or equal to $20 \cdot 10^{-3}$ $(Wm)^{-1}$, such as more than or equal to $30 \cdot 10^{-3}$ $(Wm)^{-1}$, such as more than or equal to $40 \cdot 10^{-3}$ $(Wm)^{-1}$, such as more than or equal to $50 \cdot 10^{-3}$ $(Wm)^{-1}$.

In one embodiment a non-linear fibre is taken to mean fibre having a non-linear parameter γ when guiding a wavelength of 1064 wherein γ is more than or equal to $5 \cdot 10^{-3}$ $(Wm)^{-1}$, such as more than or equal to $10 \cdot 10^{-3}$ $(Wm)^{-1}$, such as more than or equal to $15 \cdot 10^{-3}$ $(Wm)^{-1}$, such as more than or equal to $20 \cdot 10^{-3}$ $(Wm)^{-1}$, such as more than or equal to $30 \cdot 10^{-3}$ $(Wm)^{-1}$, such as more than or equal to $40 \cdot 10^{-3}$ $(Wm)^{-1}$, such as more than or equal to $50 \cdot 10^{-3}$ $(Wm)^{-1}$.

In one embodiment a non-linear fibre is taken to mean fibre where said fibre guide light for at least a range of wavelengths λmin to λmax and a mode field diameter MFD of the fundamental mode least part of said range the fraction MFD/λ is less than or equal to 5, such as less than or equal to 4, such as less than or equal to 3, such as less than or equal to 2, such as less than or equal to 1.

In one embodiment a non-linear fibre is taken to mean a fibre having a mode field diameter MFD when guiding a wavelength of 1550 nm wherein said MFD is less than or equal to 10 μm, such as less than or equal to 8 μm, such as less than or equal to 6 μm, such as less than or equal to 5 μm, such as less than or equal to 4 μm, such as less than or equal to 3 μm, such as less than or equal to 2 μm, such as less than or equal to 1 μm.

In one embodiment a non-linear fibre is taken to mean a fibre having a mode field diameter MFD when guiding a wavelength of 1064 nm wherein said MFD is less than or equal to 6 μm, such as less than or equal to 5 μm, such as less than or equal to 4 μm, such as less than or equal to 3 μm, such as less than or equal to 2 μm, such as less than or equal to 1 μm.

In the above embodiments the range of wavelengths $\lambda_{min}$ to $\lambda_{max}$ may be selected from the group of 350 nm to 2000 nm, 980 nm to 1550 nm, 1100 to 1550 nm, 1300 nm to 1450 nm. In one embodiment the range of wavelengths $\lambda_{min}$ to $\lambda_{max}$ is selected so as to limit the consideration to the range of wavelengths wherein the fibre is single mode.

In a preferred embodiment the fibre is a silica fibre, wherein at least a part of the core being of silica, preferably at least the entire core being of silica, such as the entire core and part or all of the cladding. As microstructured fibres often guides by holes extending in the cladding said fibre often consist entirely of un-doped silica (i.e. both core and cladding are made of silica) in opposition to e.g. standard single mode communication fibres where the core is commonly doped with germanium in order to change the refractive index.

Accordingly, in one embodiment the core of the fibre comprises a Germanium content of less than or equal to 10 at %, such as less than 5 at %, such as less than 3 at %, such as less than 2 at %, such as less than 0.1 at %, such as less than 0.01 at %, such as less than 0.001 at %.

In one embodiment the invention relates to An optical system comprising an optical fibre according to the invention and a feeding unit wherein said feeding unit adapted to feed said fibre with pulses with a peak power density within said fibre equal to or higher than 100 W/μm², such as equal to or higher than 500 W/μm², such as equal to or higher than 1000 W/μm², such as equal to or higher than 2500 W/μm², such as equal to or higher than 5000 W/μm², such as equal to or higher than 7500 W/μm², such as equal to or higher than 10.000 W/μm². Pulses providing such power density in the fibre are in the present application referred to as high pulse applications.

The feeding unit is commonly a pump light source and may also comprise one or more amplifiers. In principle the feeding unit may be any optical system feeding pulses to the fibre having the specified power density inside the fibre.

As the fibre according to the invention has no or reduced degradation due to exposure to high peak power such a system would likely have an extended life-time of operation.

In one embodiment the invention relates to a supercontinuum light source comprising a pulsed pump light source and an optical fibre according to the invention wherein said pump source is adapted to provide pulses with a peak power density within said fibre equal to or higher than 100 W/μm², such as equal to or higher than 500 W/μm², such as equal to or higher than 1 kW/μm², such as equal to or higher than 2.5 kW/μm², such as equal to or higher than 5 kW/μm², such as equal to or higher than 7.5 kW/μm², such as equal to or higher than 10 kW/μm², such as equal to or higher than 15 kW/μm², such as equal to or higher than 20 kW/μm², and/or wherein said pump and fibre is adapted to provide an output spanning over at least one octave with at least 10 μW/nm and/or wherein said pump and said fibre is adapted to provide a maximum modulation instability gain $\Omega_{max}$ such as larger than 20, such as larger than 40.

Here the modulation instability gain $\Omega_{max}$ is given by $$\Omega_{max} = \pm \sqrt{\frac{2\gamma P_{peak}}{|\beta_2|}},$$

where $\beta_2$ is the group velocity at the pump wavelength, $P_{peak}$ is the peak power of the pump and γ is the pump wavelength.

In one example more than one octave span has been achieved with the nonlinear fibre SC-5.0-1040 from the Danish company Crystal Fibre A/S. Using this fibre with a peak power of 200 W pumped at 1064 nm provided $\Omega_{max}$=22 (A peak power of 200 W is e.g. obtained through a 50 MHz, 100 mW input signal with 10 ps pulses).

The phrase spanning over at least one octave with at least a specific power value (per nm wavelength) is in this context of the present invention taken to mean that the optical spectrum of the output of the light source spans at least an octave defining the outer limits of said spectrum by said specific power value. The spectrum may have holes; however, it is assumed that more than 25% of the spanned spectrum has at least the specific power value. In an embodiment at least 30% of the spanned spectrum has at least the specific power value, such as at least 40%, such as at least 60%, such as at least 80%, such as at least 99%, such as at least 99.9%.

In one embodiment the output spans over at least one octave with at least 50 µW/nm, such as more than or equal to 500 µW/nm, such as more than or equal to 1 mW/nm, such as more than or equal to 5 mW/nm, such as more than or equal to 10 mW/nm. Depending on the chosen power limit one embodiment may also span over more than or equal to 0.5 octave, such more than or equal to 1.5 octave, such more than or equal to 2 octaves.

In one aspect the invention relates to a method producing a microstructured fibre comprising a core and a cladding comprising a core material and a cladding material, respectively, said fibre having extended life time in high pulse applications the method comprising
 a. loading said core material and optionally said cladding material with hydrogen and/or deuterium.
 b. optionally annealing said for a time $t_{anneal}$ at a temperature $T_{anneal}$.

Such a method may be advantageously applied to produce a fibre according to the invention and any features described in relation to features of the fibre may apply mutatis mutandis to the method of producing the fibre.

In one embodiment the said loading is performed by subjecting the fibre material to hydrogen and/or deuterium under loading conditions suitably to allow hydrogen and/or deuterium to bind chemically to said material(s), said loading condition preferably include at least one of a) a raised temperature T, b) a raised pressure P and/or c) subsequent irradiation.

In an embodiment the invention relates to an apparatus comprising an optical fibre according to the invention, an optical system according to the invention, a light source according to the invention and/or a fibre produced according to the invention. In one embodiment the apparatus constitutes a system for various forms of fluorescent microscopy, laser precision spectroscopy, and optical coherence tomography (OCT).

It has furthermore been found that it is possible to regenerate a degenerated fibre providing fibre commonly with extended lifetime compared to an identical fibre not subjected to use or loading. Accordingly, in one embodiment the invention relates to a method of regenerating an microstructured fibre comprising a core and a cladding comprising a core material and a cladding material, respectively, said fibre having increased absorption in the visible due to subjection to pulses in a high pulse application the method comprising the method comprising loading the fibre with hydrogen and/or deuterium.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILS OF THE INVENTION

In the following the invention will be discussed based on measured data. The conclusions drawn from these should not be considered limited to the specifics of the underlying experiment but rather illustrations of results obtainable by the invention In the following measured data where obtained for a supercontinuum light sources comprising a pump source and a non-linear microstructured silica fibre. The fibre was pumped at 1064 nm with 8 ps pulses at a repetition rate of 80 MHz providing a 15 W input average power (23 kW peak power). The fibre had a mode field diameter of 3.5 µm and was approximately 7 meters in length.

The length of the fibre is preferable kept short to keep the consumption and of fibre to a minimum while still providing sufficient length to allow the non-linear processes underlying a supercontinuum to provide a desirable spectrum. This length commonly depends on the shape of the pulses as shorter fibre is commonly sufficient for shorter pulses. In one embodiment the non-linear fibre have a length of 1 cm or longer, such 10 cm or longer, such 1 m or longer, such 5 m or longer, such as 8 m or longer, such as 10 m or longer.

In one embodiment the non-linear microstructured fibre is 50 m or less, such as 30 m or less, such as 10 m or less.

Figure 1:
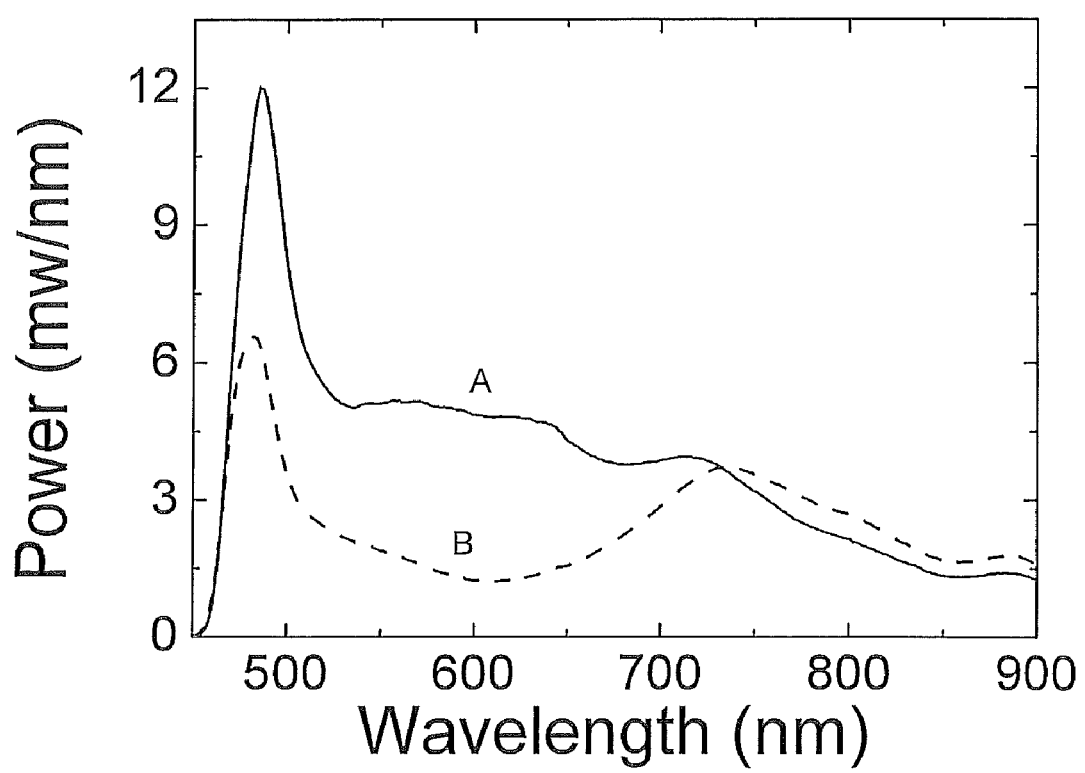
FIG. 1 shows typical supercontinuum spectra in initial operation of a prior art microstructured optical fibre (A) and after 35 hours of operation (B) all else equal. The reduction in the visible spectrum testifies to the degradation of the fibre.
Figure 2:
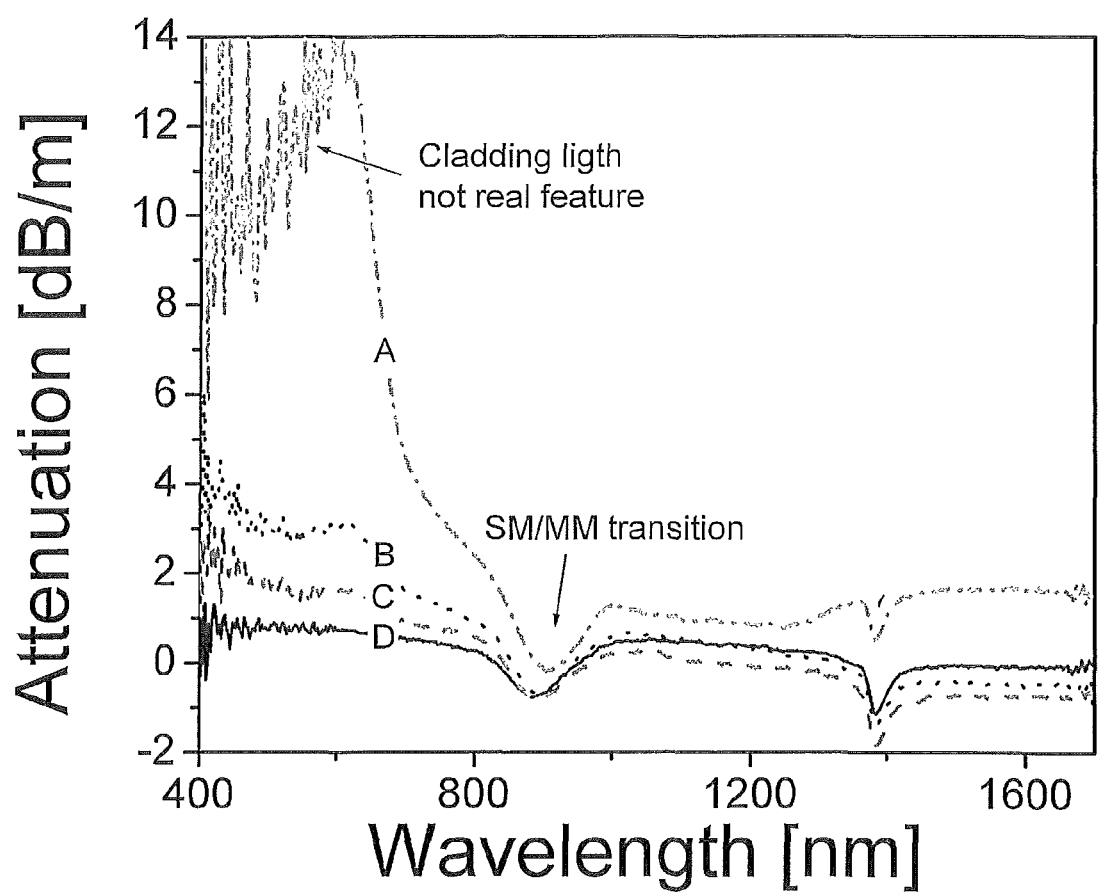
FIG. 2 shows measured attenuation for a prior art nonlinear fibre operated for 35 hours as a function of the position of the fibre.
Figure 3:
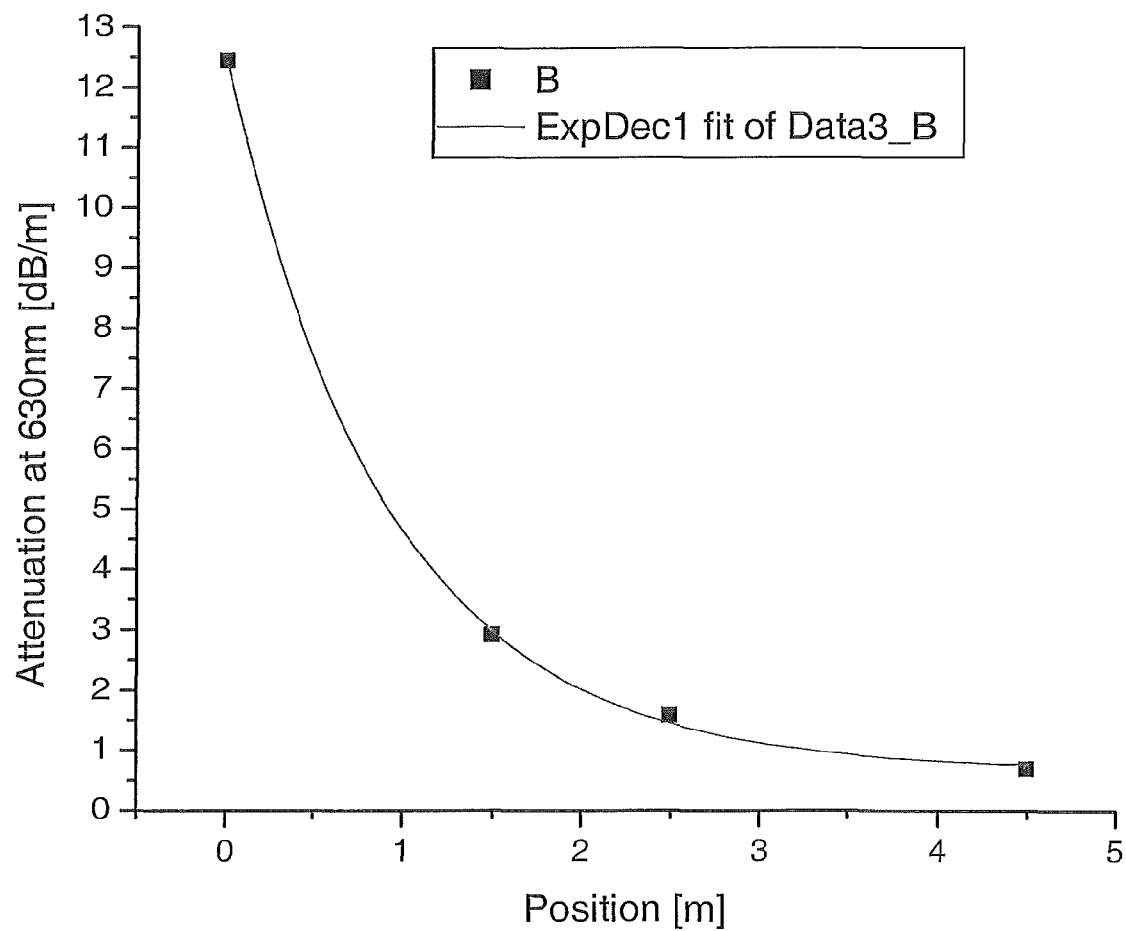
FIG. 3 shows 633 nm absorption as function of position in the nonlinear fibre.

FIG. 1 shows typical supercontinuum spectra in initial operation of a prior art microstructured optical fibre (A) and after 35 hours of operation (B) all else equal. The reduction in the visible portion of the spectrum extending from about 450 nm to about 750 nm testifies to the degradation of the fibre. The phenomenon is investigated further by the measurements shown in FIG. 2 showing attenuation for the prior art nonlinear fibre operated for 35 hours as a function of the position of the fibre. A is measured through the first 3 m of the non linear fibre (NL-fibre), B is through 3-4 m, C through 4-5 m and D through 5-7 m. The curves are obtained by subtracting a 7 m long reference non-linear fibre. Very large absorption is observed in the visible part of the spectrum due to the degradation of the fibre. The dip at 0.9 µm and 1.4 µm likely stems from the single-mode cut-off for the nonlinear fibre and differences in O—H peak absorption for the nonlinear fibre and the reference fibre, respectively. In order to support the hypothesis that the degradation is caused by interaction with the relatively high powered pump pulse the absorption is expected to by larger closer to the pump. This tendency is clear as the absorption drops as the fibre sections are taken from parts which were operated further and further from the pump. This trend is also found in FIG. 3 showing that measurements of the absorption at 633 nm as a function of distance from the fit will to an exponential.

Figure 4:
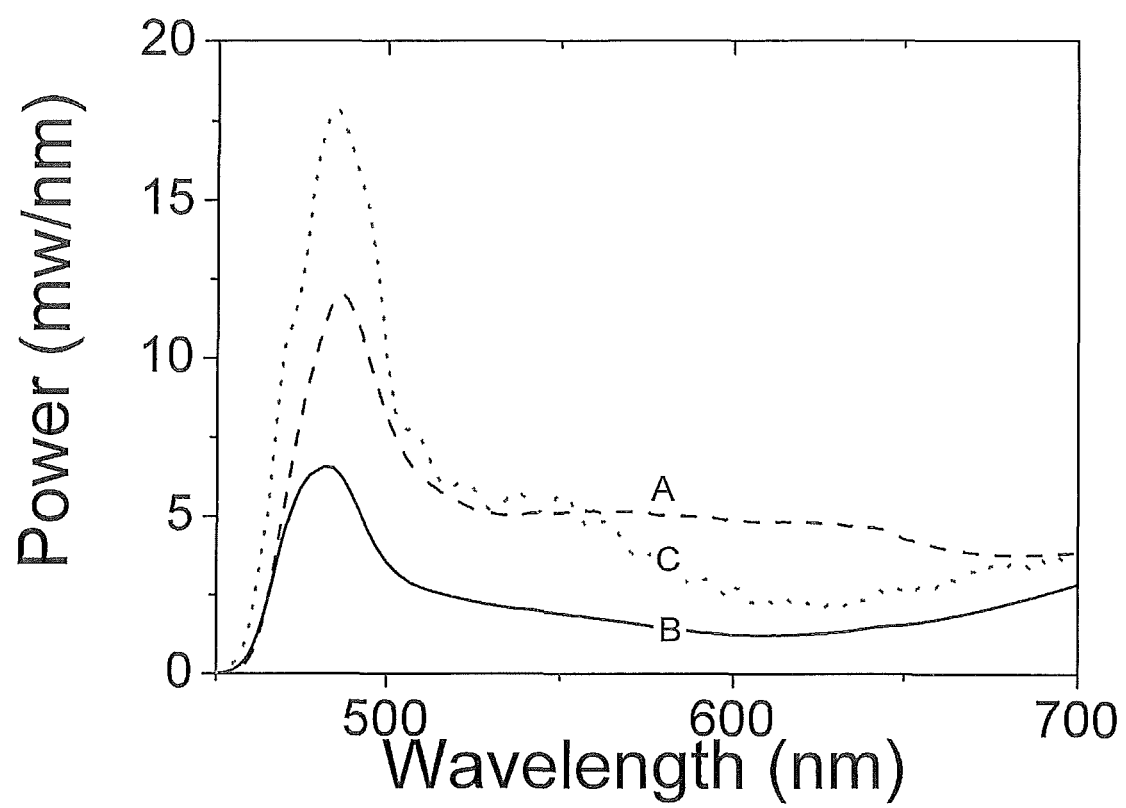
FIG. 4 shows the supercontinuum spectra in the beginning of the experiment (A), after 35 hours were the visible dip is observed (B) and again after heating the fibre to 250° C. (C)

FIG. 4 shows the supercontinuum spectra in the beginning of the experiment (A), after 35 hours were the visible dip is observed (B) and again after heating the fibre to 250° C. (C). The heating seems to partly regenerate the fibre. The inventors hypothesize that the regeneration of the fibre may an indicator of the pump pulses altering the structure of at least a part of the glass. Allowing the glass to reach a higher temperature may allow the glass to resettle causing it to at least partly regenerate.

Figure 5:
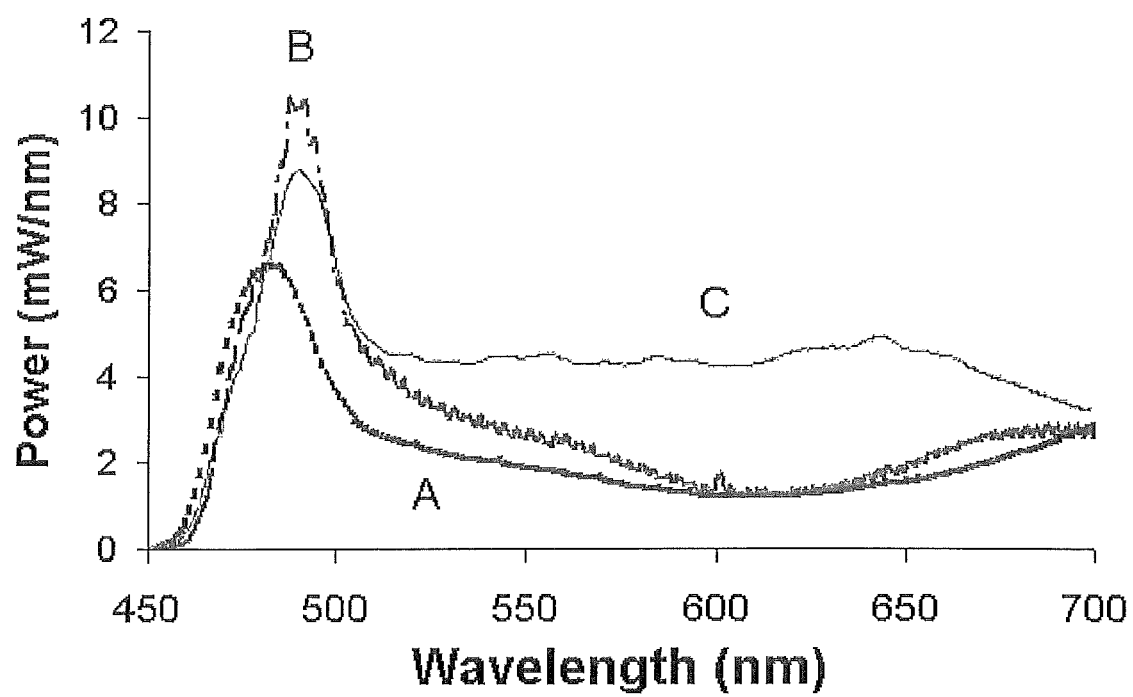
FIG. 5 shows supercontinuum spectra after 35 hours were a visible dip is observed and again after heating the fibre to 250° C. and after the fibre has been deuterium loaded.

FIG. 5 shows supercontinuum spectra after 35 hours where a visible dip is observed and again after heating the fibre to 250° C. and after the fibre has been deuterium loaded and subsequently annealed. The deuterium loading clearly regenerated the fibre and the spectrum resembles the initial spectrum (see FIG. 4) without any visible dip in the spectrum.

In the present embodiments the fibre is preferably loaded with deuterium as hydrogen may bind to oxygen in the fibre forming O—H bonds which are well known to have a large absorption peak around 1400 nm. Such absorption is undesirable for these embodiments but hydrogen may be preferable for applications where such absorption is either insignificant or even preferable, particularly when it is noted that hydrogen is commonly significantly cheaper than deuterium.

Figure 6:
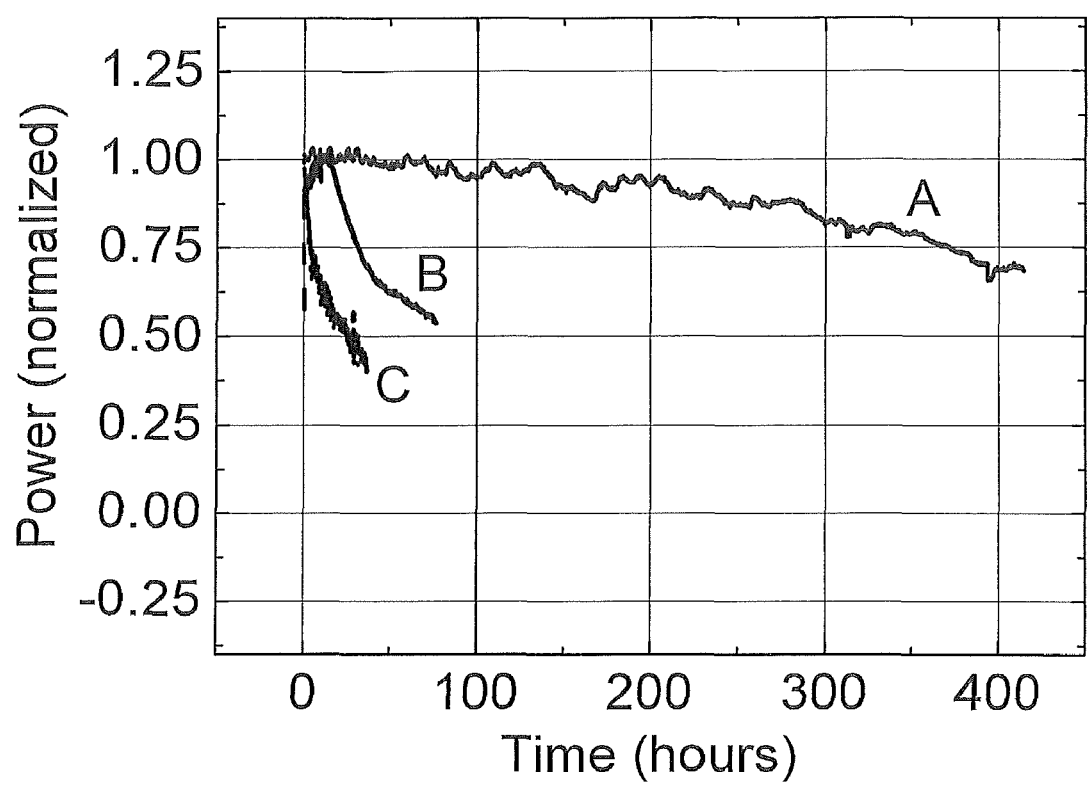
FIG. 6 shows measured visible power as function of time for nonlinear fibres deuterium loaded at 160 C (A), at 80 C (B) and not deuterium loaded (C)

In FIG. 6 the results is shown for different deuterium loading conditions. The visible power is measured as function of time for 3 pieces of identical nonlinear fibres deuterium loaded at different conditions. The lifetime of the deuterium loaded fibres is extended significantly compared to non loaded fibres. All fibres are loaded at 100 bar pressure with approximately 100% deuterium. Loading of the fibres may preferably be performed by exposing the fibre to a high partial pressure of deuterium or hydrogen at a specific temperature for a given length of time.

Figure 7:
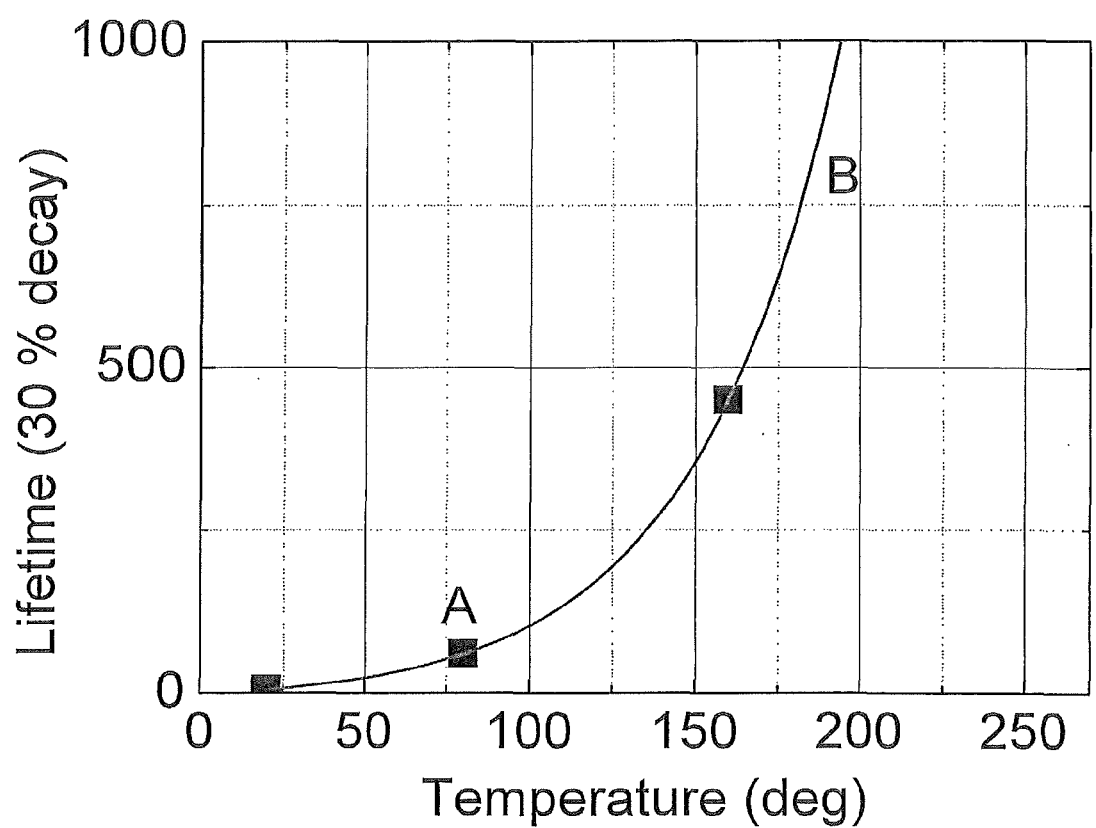
FIG. 7 shows extracted lifetime as function of three different deuterium loading temperatures (A) and an exponential fit to the measurements (B)

FIG. 6 shows measured visible power as function of time for 3 pieces of identical nonlinear fibres deuterium loaded at 160 C (A), at 80 C (B) and not deuterium loaded (C). The lifetime of the deuterium loaded fibres is increased by at least 2 orders of magnitude compared to unloaded fibres. All fibres are loaded at 100 bar pressure with 100% deuterium FIG. 7 shows lifetime shown in FIG. 6 as function of three different deuterium loading temperatures (A) and an exponential fit to the measurements (B). In this example the lifetime was defined as the power of light in the visible has decreased 30%. Depending on the application the life time may be defined as the absorption of light in the visible has decreased by more than 40%, such as more than 50%, such as more than 70%, such as more than 80%, such as more than 90%. Visible light may in the context be defined as an integral of light in the range 0.5 to 0.7 µm. Alternatively; one or more wavelength values may be specified such as the absorption at 650 nm and/or at 633 nm. The deuterium loaded measurements as function of temperature clearly indicate that the lifetime increases almost exponential with loading temperature. Based on this dependency of temperature it is speculated that the increase in life time of the fibre is due to deuterium bound to the material (in this case silica glass) and the temperature acts a provider of the necessary activation energy for this to occur. Alternatively, such a chemical process may be induced providing sufficiently high pressure. Finally, activation by irradiation simultaneously or post to diffusing deuterium into the material is also speculated to enable the binding of the deuterium. Accordingly, in a preferred embodiment the fibre is being loaded by subjecting it to hydrogen and/or deuterium under loading conditions suitably to allow hydrogen and/or deuterium to bind chemically to said material(s), said loading condition preferably include at least one of a) a raised temperature T, b) a raised pressure P and/or c) subsequent irradiation. By this an fibre comprising an increased amount of hydrogen and/or deuterium so that in one embodiment the loaded material comprises more than 0.1 atom percent (at %) bound hydrogen and/or deuterium, such as more than 1 at %, such as more than 5 at %, such as more than 10 at %, such as more than 20 atom percent, such as more than 50 at %.

In one embodiment the temperature T is raised to allow for binding as discussed above so that T more than or equal to 80° C., such as more than or equal to 100° C., such as more than or equal to 120° C., such as more than or equal to 140° C., such as more than or equal to 160° C., such as more than or equal to 180° C., such as more than or equal to 200° C., such as more than or equal to 220° C., such as more than or equal to 240° C., such as more than or equal to 260° C., such as more than or equal to 280° C., such as more than or equal to 300° C., such as more than or equal to 350° C., such as more than or equal to 400° C., such as more than or equal to 450° C., such as more than or equal to 500° C.

The non-linear fibre may and may not comprise a polymer coating onto its cladding. In situation where the non-linear fibre comprises a polymer coating the loading temperature for loading deuterium and/or hydrogen should preferably be kept below the melting or even softening temperature of the polymer. The upper limit for increasing the deuterium loading temperature is likely due to the coating of the fibre. High temperature coating can extend the deuterium loading temperature to above 250° C., and thereby enable significant lifetime enhancement. Alternatively fibres without coating can be produced enabling very high loading temperature e.g. up to and above 500° C. and/or loading of the core (and optionally cladding) material may be performed prior or during the process of forming the fibre i.e. prior to coating. In principle these arguments may be applicable to other coating types as well.

The chemical reaction time is expected to depend on the temperature and/or pressure but the loading time should preferably at least be sufficient to ensure that thermal equilibrium has occurred.

Similarly to the temperature, in one embodiment the pressure P is more than or equal to 10 bars, such more than or equal to 25 bar, such more than or equal to 50 bars, such more than or equal to 75 bar, such more than or equal to 90 bar, such as more than or equal to 120 bar, such as more than or equal to 160 bar, such as more than or equal to 200 bar, such as more than or equal to 500 bar, such as more than or equal to 1000 bar, such as more than or equal to 2000 bar.

The above mentioned radiation may in principle be any radiation suitable for providing significant activation energy. In one preferred embodiment pulses otherwise suitable for supercontinuum generation (e.g. such pulses as discussed in "Summary of the invention") are applied to bind hydrogen or deuterium in the fibre. In one embodiment the fibre cooled subsequently to loading and optionally annealing in order to reduce diffusion of remaining unbound hydrogen/deuterium out of the fibre prior to use. The fibre is preferably kept cool for storage prior to use or for at least part of the storage period. Once in use it is speculated the pumping of the fibre in generation of supercontinuum light provides sufficient energy to bind at least part of the remaining hydrogen/deuterium.

It is speculated that in principle the materials may be loaded at anytime in the process of forming the fibre. However, consideration may have to be taken to ensure that processes following the loading do not disrupt the achieved extension of the lifetime of the final fibre. Accordingly, in one embodiment the loading of said of the core material and optionally of said cladding material being performed prior to forming said fibre, during forming of said fibre or after forming. Furthermore, as shown in FIG. 5 fibres may, at least partially, be regenerated so that in one embodiment the fibre is loaded after use.

As the water band discussed above may be detrimental to some applications it may be preferable to load the fibre with as little hydrogen as possible so that in one embodiment the loaded fibre comprises bound deuterium relative to bound hydrogen (and/or their corresponding ions) of more than or equal to 1%, such as more than or equal to 10%, such as more than or equal to 100%, such as more than or equal to 10.000% by atom.

After deuterium or hydrogen loading, the fibre is preferably annealed enhance diffusion of unbound deuterium or hydrogen in the fibre. The fibre is preferably annealed at a medium temperature so as not to provide sufficient energy to unbind hydrogen/deuterium once again. In the figures presented above annealing were performed at 80° C. The out diffusion of the unbound hydrogen/deuterium would also occur during 2 to 3 months if the fibre was stored at room temperature. The anneal enables splicing the fibre to other fibres (plasma heating of hydrogen/deuterium, such as in fusion splicing may be explosive) and reduced the added photosensitivity due to these molecules. Excessive anneal temperature above approximate 1000° C. may lead to out diffusion of the bound hydrogen/deuterium and therefore commonly undesirable. Accordingly, in one embodiment the method of producing a fibre according comprises annealing the loaded material subsequent to loading.

Figure 8:
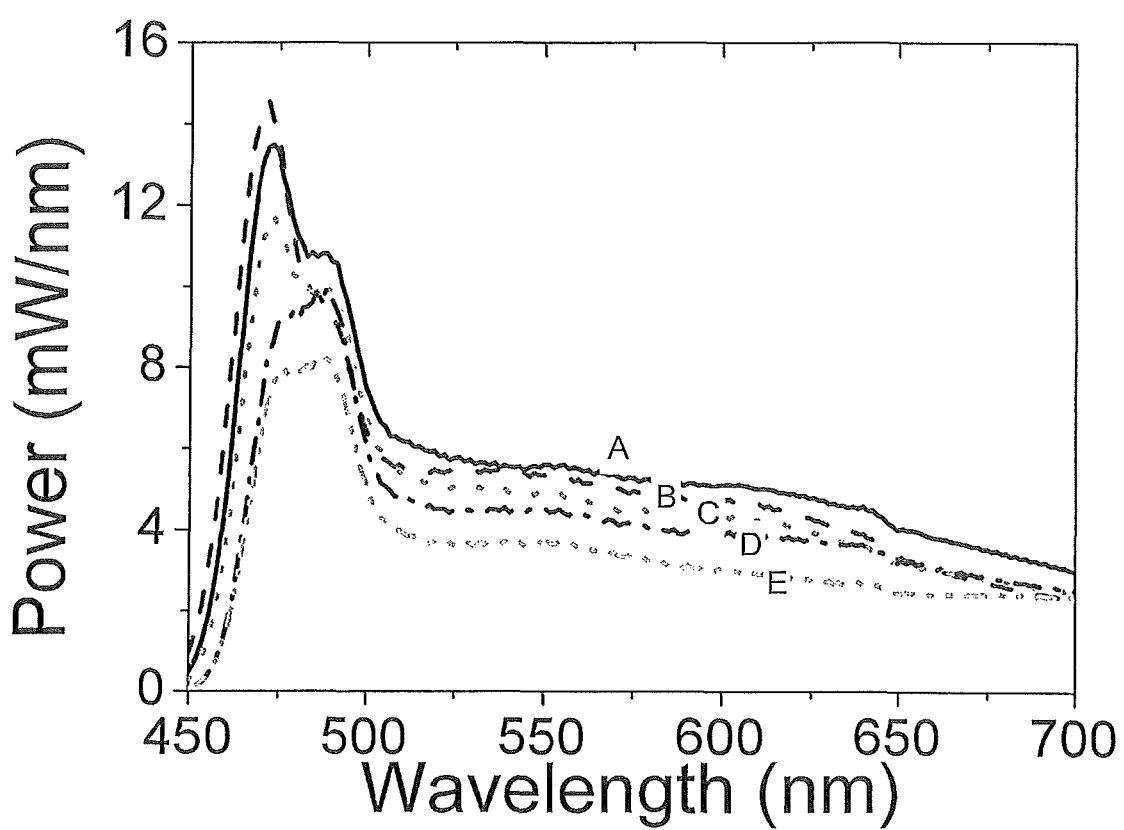
FIG. 8 shows measured spectra for a deuterium loaded nonlinear fibre after 0 hours (A), 188 hours (B), 260 hours (C), 305 hours (D) and 450 hours (E)

FIG. 8 shows measured spectra for a deuterium loaded nonlinear fibre after 0 hours (A), 188 hours (B), 260 hours (C), 305 hours (D) and 450 hours (E). The prominent dip for non loaded nonlinear fibre in the visible spectrum from 0.5 to 0.7 μm is no longer observed. In addition, to increase the lifetime of the nonlinear fibre the deuterium loading has also shown to significantly alter the spectral changes of the fibre under operation compared to un-loaded fibres. Relative to an unleaded fibre the degradation is no longer observed as a dip in the visible spectrum, but as a slowly decreasing overall visible power. Only the short wavelength range seems to be altered significantly over time.

In one embodiment the life time of the fibre is extended relative to the life time of an otherwise identical fibre not subjected to loading by deuterium and or hydrogen by more than 50%, such as more than 100%, such as more than 200%, such as more than 500%, such as more than 1000%, such as more than 10.000%. As the absolute life time of a fibre subjected to pulses suitable for generating a supercontinuum may vary depending on the application as well as, it is speculated, on the particular material of the fibre core in one embodiment the life time is more than 100 operating hours, such as more than operating 200 hours, such as more than operating 2000 hours, such as more than operating 20000 hours, such as more than operating 50.000 hours.

Figure 9:
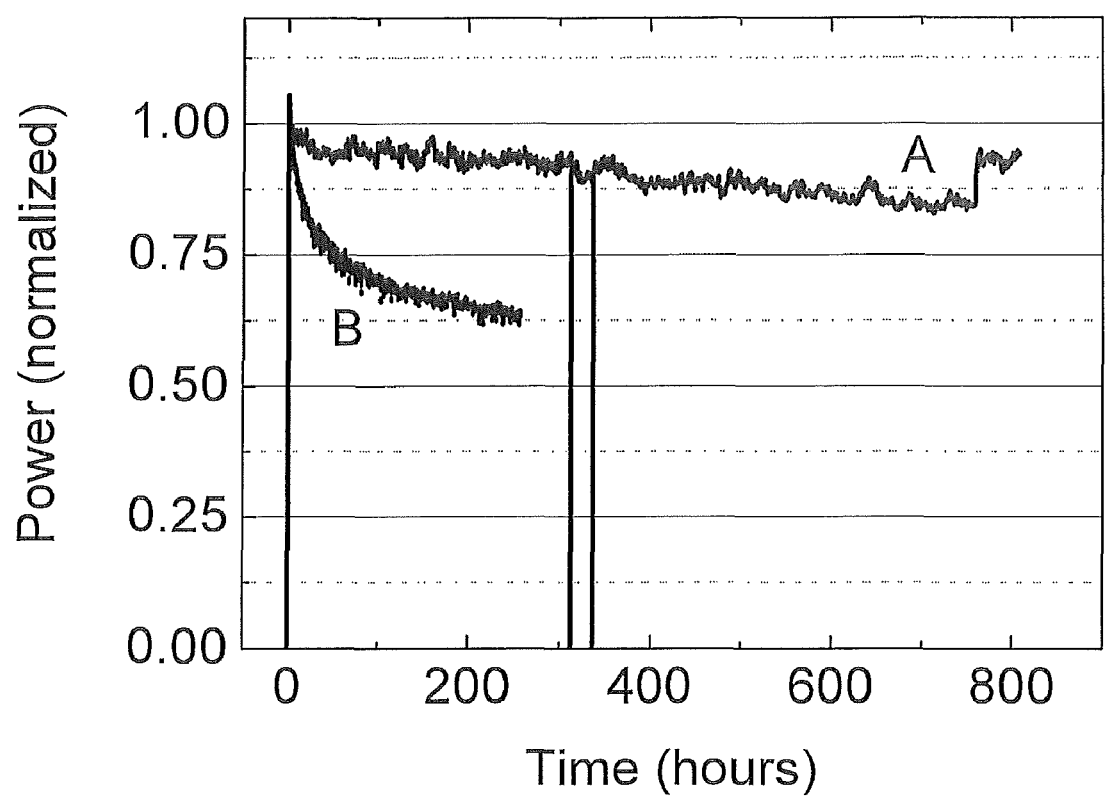
FIG. 9 shows measured visible power as function of time for nonlinear fibres with less glass impurities.

FIG. 9 shows measured visible power as function of time for nonlinear fibres with less glass impurities. The impurity level, and particularly the amount of Cl atoms in the glass seems, appears to influence the life time of the fibre. It seems that at least to some extend the smaller the amount of Cl the longer lifetime. Compared to FIG. 5 the lifetime is significantly extended indicating that the damage threshold depends on the glass impurity level. However, the lifetime of the deuterium loaded fibre (A) is still significantly increased compared to the unloaded fibre (B). The increase in output power for the deuterium loaded fibre after 750 hours is due to an increase in pump power.

It is speculated that the life time extension is provided by bound deuterium/hydrogen relative to total number of impurities in the core and in some application also in the cladding material. Accordingly, in one embodiment the core of the fibre being a solid core (preferably silica) wherein the fraction of bound hydrogen and/or deuterium relative to the total number of impurities is more than or equal to 10%, such as more than or equal to 20%, such as more than or equal to 30%, such as more than or equal to 40%, such as more than or equal to 50%, such as more than or equal to 60%, such as more than or equal to 70%, such as more than or equal to 80%, such as more than or equal to 90%, such as more than or equal to 99%, such as more than or equal 99.9.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. In particular the application of non-linear microstructured fibres has been applied to discuss the invention; however, it speculated that the invention may be relevant for other applications of non-linear microstructured fibres wherein transmission in the visible important for a high pulse application.

The invention claimed is:

1. An optical system comprising an optical fiber, said optical fiber comprising a core and a cladding comprising a core material and a cladding material, respectively, wherein said fiber is a non-linear microstructured optical fiber, said microstructured optical fiber being obtainable by a method comprising loading said core material and optionally said cladding material with hydrogen and/or deuterium, said system further comprising a feeding unit wherein said feeding unit is adapted to feed said fiber with pulses with a peak power density within said fiber equal to or higher than 1000 W/μm$^2$.

2. The optical system of claim 1 wherein said fiber is arranged to be in an environment where it is subjected to a medium with a content of $H_2$ and/or $H^+$-ions of less than 0.1 at %.

3. The optical system of claim 1 wherein said life time is more than 2000 operating hours.

4. A supercontinuum light source comprising a pulsed pump light source and an optical fiber, said optical fiber comprising a core and a cladding comprising a core material and a cladding material, respectively, wherein said fiber is a non-linear microstructured optical fiber, said microstructured optical fiber being obtained by a method comprising loading said core material and optionally said cladding material with hydrogen and/or deuterium, wherein said pump and fiber are adapted to provide an output spanning over at least one octave with at least 10 µW/nm and/or wherein said pump and said fiber are adapted to provide a maximum modulation instability gain $\Omega_{max}$ larger than 20.

5. The light source of claim 4, wherein said fiber is loaded by subjecting it to hydrogen and/or deuterium under loading conditions comprising at least one of a) a raised temperature T , b) a raised pressure P and/or c) subsequent irradiation.

6. The light source of claim 4, wherein said fiber is loaded by subjecting it to hydrogen and/or deuterium under loading conditions suitably to allow hydrogen and/or deuterium to bind chemically to said material(s).

7. The light source of claim 5, wherein T is more than or equal to 80° C.

8. The light source of claim 5, wherein the pressure P is more than or equal to 10 bars.

9. The light source of claim 4, wherein said loading of said core material and optionally of said cladding material is performed after forming said fiber.

10. The light source of claim 4, wherein said loading of said core material and optionally of said cladding material is performed after using said fiber.

11. The light source of claim 4, wherein said method comprises annealing said material subsequent to loading.

12. The light source of claim 4, wherein said material comprises more than 0.1 atom percent (at %) bound hydrogen and/or deuterium.

13. The light source of claim 4, wherein said core having a Germanium content of less than or equal to 2 at %.

14. The light source of claim 4, wherein said core having a Germanium content of less than or equal to 0.1 at %.

15. The light source of claim 4, having a core made from undoped silica.

16. The light source of claim 4, wherein said pump and said fiber are adapted to provide a maximum modulation instability gain $\Omega_{max}$ larger than 40.

17. The system of claim 1, wherein said fiber is loaded by subjecting it to hydrogen and/or deuterium under loading conditions comprising at least one of a) a raised temperature T , b) a raised pressure P and/or c) subsequent irradiation.

18. The system of claim 1, wherein said fiber is loaded by subjecting it to hydrogen and/or deuterium under loading conditions suitably to allow said hydrogen and/or deuterium to bind chemically to said material(s).

19. The system of claim 17, wherein T is more than or equal to 80° C.

20. The system of claim 17, wherein the pressure P is more than or equal to 10 bars.

21. The system of claim 1, wherein said loading of said core material and optionally of said cladding material is performed after forming said fiber.

22. The system of claim 1, wherein said loading of said core material and optionally of said cladding material is performed after using said fiber.

23. The system of claim 1, wherein said method comprises annealing said material subsequent to loading.

24. The system of claim 1, wherein said material comprises more than 0.1 atom percent (at %) bound hydrogen and/or deuterium.

25. The system of claim 1, wherein said core comprising a Germanium content of less than or equal to 2 at %.

26. The system of claim 1, wherein said core comprising a Germanium content of less than or equal to 0.1 at %.

27. The system of claim 1, wherein said core is made from un-doped silica.

* * * * *

UNITED STATES PATENT AND TRADEMARK OFFICE
CERTIFICATE OF CORRECTION

| | | |
|---|---|---|
| PATENT NO. | : 8,145,023 B2 | Page 1 of 1 |
| APPLICATION NO. | : 12/522758 | |
| DATED | : March 27, 2012 | |
| INVENTOR(S) | : Thomsen | |

It is certified that error appears in the above-identified patent and that said Letters Patent is hereby corrected as shown below:

In the Specification

Column 3, Line 11: change "Error! Objects cannot be created from editing field codes." to -- $\gamma = \frac{2\pi\, n_2}{\lambda\, A_{eff}}$ --

Column 4, Line 41: change "20" to --20 THz--

Column 4, Line 41: change "40" to --40 THz--

Column 4, Line 50: change "γ is the pump wavelength" to --γ is the non-linear parameter at the pump wavelength--

Column 4, Line 54: change "22" to --22 THz--

In the Claims

Column 11, Claim 4, Line 3: change "20" to --20 THz--

Column 12, Claim 16, Line 3: change "40" to --40 THz--

Signed and Sealed this
Twenty-third Day of December, 2014

Michelle K. Lee
*Deputy Director of the United States Patent and Trademark Office*